(12) United States Patent
Masotti

(10) Patent No.: US 12,466,770 B2
(45) Date of Patent: Nov. 11, 2025

(54) PREPARATION OF HYDROUS GRAPHENE OXIDE FOR USE AS A CONCRETE ADMIXTURE

(71) Applicant: Alter Biota Inc., Sydney (CA)

(72) Inventor: Mark Masotti, Toronto (CA)

(73) Assignee: ALTER BIOTA INC., Toronto (CA)

( * ) Notice: Subject to any disclaimer, the term of this patent is extended or adjusted under 35 U.S.C. 154(b) by 857 days.

(21) Appl. No.: 17/616,641

(22) PCT Filed: Jul. 6, 2020

(86) PCT No.: PCT/CA2020/050939
§ 371 (c)(1),
(2) Date: Dec. 4, 2021

(87) PCT Pub. No.: WO2021/003565
PCT Pub. Date: Jan. 14, 2021

(65) Prior Publication Data
US 2022/0234955 A1 Jul. 28, 2022

Related U.S. Application Data

(60) Provisional application No. 62/871,355, filed on Jul. 8, 2019.

(51) Int. Cl.
| | | |
|---|---|---|
| *C01B 32/198* | (2017.01) | |
| *C04B 28/02* | (2006.01) | |
| *C04B 40/00* | (2006.01) | |
| *C04B 103/30* | (2006.01) | |
| *C04B 103/40* | (2006.01) | |

(52) U.S. Cl.
CPC ............ *C04B 28/02* (2013.01); *C01B 32/198* (2017.08); *C04B 40/0039* (2013.01); *C04B 40/005* (2013.01); *C04B 2103/302* (2013.01); *C04B 2103/408* (2013.01); *C04B 2201/50* (2013.01)

(58) Field of Classification Search
CPC .................................................. C01B 32/198
See application file for complete search history.

(56) References Cited

U.S. PATENT DOCUMENTS

| | | |
|---|---|---|
| 8,216,541 B2 | 7/2012 | Jang et al. |
| 8,501,318 B2 | 8/2013 | Jang et al. |
| 8,658,555 B1 | 2/2014 | Bandosz et al. |
| 8,696,938 B2 | 4/2014 | Zhamu et al. |
| 8,715,610 B2 | 5/2014 | Wallace et al. |
| 8,728,578 B2 | 5/2014 | Rafailovich et al. |
| 8,771,630 B2 | 7/2014 | Wu et al. |
| 8,834,959 B2 | 9/2014 | Drzal et al. |
| 8,883,042 B2 | 11/2014 | Sokolov et al. |
| 8,926,935 B2 | 1/2015 | Krishnaiah et al. |
| 9,145,302 B2 | 9/2015 | Choi et al. |
| 9,162,894 B2 | 10/2015 | Liu et al. |
| 9,284,193 B2 | 3/2016 | Cruz-Silva et al. |
| 9,328,221 B2 | 5/2016 | Liu et al. |
| 9,403,115 B2 | 8/2016 | Majumder et al. |
| 9,449,816 B2 | 9/2016 | Gharib et al. |
| 9,493,594 B2 | 11/2016 | Goffredi et al. |
| 9,534,319 B2 | 1/2017 | Tour et al. |
| 9,695,516 B2 | 7/2017 | Wei et al. |
| 9,738,528 B2 | 8/2017 | Lee et al. |
| 9,758,379 B2 | 9/2017 | Blair |
| 9,831,501 B2 | 11/2017 | Kang et al. |
| 9,938,150 B2 | 4/2018 | Zhang et al. |
| 10,040,688 B2 | 8/2018 | Hong et al. |
| 10,193,156 B2 | 1/2019 | Yang et al. |
| 10,287,167 B2 | 5/2019 | Blair et al. |
| 10,351,433 B2 | 7/2019 | Jeong et al. |
| 10,351,473 B2 | 7/2019 | Christiansen et al. |
| 10,392,255 B2 | 8/2019 | Grigorian et al. |
| 10,647,581 B2 | 5/2020 | Jin et al. |
| 10,766,774 B2 | 9/2020 | Gohda et al. |
| 10,822,239 B2 | 11/2020 | Lin et al. |
| 10,961,124 B2 | 3/2021 | Zhou et al. |
| 10,981,791 B2 | 4/2021 | Christiansen et al. |
| 10,988,385 B2 | 4/2021 | Sarkar et al. |
| 11,014,818 B2 | 5/2021 | Amir et al. |

(Continued)

FOREIGN PATENT DOCUMENTS

| | | |
|---|---|---|
| AU | 2015213412 A1 | 9/2015 |
| CN | 107556035 A | 1/2018 |

(Continued)

OTHER PUBLICATIONS

Karagiannidis, Panagiotis G., "Microfluidization of Graphite and Formulation of Graphene-Based Conductive Inks", ACS NANO, vol. 11, No. 3, Mar. 28, 2017, pp. 2742-2755, xp055693456, US ISSN: 1936-0851, DOI: 10.1021/acsnano.6b07735.

Korayem A H et al, "A review of dispersion of nanoparticles in cementitious matrices: Nanoparticle geometry perspective", Construction and Building Materials, Elsevier, Netherlands, vol. 153, Jul. 21, 2017, pp. 346-357, xp085159584, ISSN: 0950-0618, DOI: 10.1016/J.Conbuildmat.2017.06.164.

Extended European Search Report (EESR) for App. No. 20836267.3-1108, dated Jun. 30, 2023.

Bourlinos, Athanasios B., "Liquid-Phase Exfoliation of Graphite Towards Solubilized Graphenes," www.small-journal.com, Apr. 30, 2009, 5 pages.

Castillo, A. E. Del Rio, "High-Yield Production of 2D Crystals by Wet-Jet Milling," Materials Horizons, Apr. 25, 2018, 15 pages.

Du, Wencheng, "From Graphite to Graphene: Direct Liquid-Phase Exfoliation of Graphite to Produce Single—and Few—Layered Pristine Graphene," Journal of Materials Chemistry A, Jun. 2013, 15 pages.

(Continued)

*Primary Examiner* — Stuart L Hendrickson
(74) *Attorney, Agent, or Firm* — HEA Law PLLC; Darrin A. Auito

(57) ABSTRACT

An aqueous dispersion of graphene oxide is prepared in an additive process by subjecting graphitic carbon, such as biochar, in water or an aqueous solution to a high-shear environment in the presence of a dispersing agent to exfoliate graphene oxide. An intercalating agent may be added to facilitate exfoliation, and optionally neutralized. The graphitic carbon may be pre-processed by wet milling prior to exfoliation. The aqueous dispersion of graphene oxide may be used as a concrete admixture in a concrete composition.

16 Claims, 3 Drawing Sheets

(56) References Cited

U.S. PATENT DOCUMENTS

| | | | |
|---|---|---|---|
| 11,286,166 | B2 | 3/2022 | Ono et al. |
| 11,390,529 | B2 | 7/2022 | Vu et al. |
| 11,397,173 | B2 | 7/2022 | Strong et al. |
| 11,440,844 | B2 | 9/2022 | Adams |
| 11,453,594 | B2 * | 9/2022 | Zhamu ............... C01B 32/184 |
| 11,482,348 | B2 | 10/2022 | Mcinnis et al. |
| 11,545,310 | B2 | 1/2023 | Gadiwan et al. |
| 11,679,983 | B2 | 6/2023 | Geo et al. |
| 11,702,341 | B2 | 7/2023 | Vu et al. |
| 11,731,875 | B2 | 8/2023 | Johnson et al. |
| 11,739,228 | B2 | 8/2023 | Kim et al. |
| 11,742,473 | B2 | 8/2023 | Jeong et al. |
| 2013/0045156 | A1 | 2/2013 | Nomoto et al. |
| 2014/0134092 | A1 | 5/2014 | Shankman |
| 2014/0323596 | A1 | 10/2014 | Jeong et al. |
| 2015/0218392 | A1 | 8/2015 | Crain et al. |
| 2015/0239741 | A1 | 8/2015 | Burton et al. |
| 2016/0176714 | A1 | 6/2016 | Do et al. |
| 2016/0347617 | A1 * | 12/2016 | Zhang .................. C01B 32/23 |
| 2017/0233290 | A1 | 8/2017 | Christiansen et al. |
| 2018/0019069 | A1 | 1/2018 | Zhamu et al. |
| 2018/0086643 | A1 | 3/2018 | Christiansen et al. |
| 2018/0354856 | A1 | 12/2018 | Wieteska et al. |
| 2019/0039907 | A1 | 2/2019 | Zeng et al. |
| 2020/0061546 | A1 | 2/2020 | Raveendran-Nair et al. |
| 2020/0402683 | A1 | 12/2020 | Momo et al. |
| 2021/0114880 | A1 | 4/2021 | Lin et al. |
| 2021/0206646 | A1 | 7/2021 | Vu et al. |
| 2021/0221687 | A1 | 7/2021 | Vu |
| 2021/0221688 | A1 | 7/2021 | Vu |
| 2021/0230003 | A1 | 7/2021 | Vu et al. |
| 2021/0238041 | A1 | 8/2021 | Gohda et al. |
| 2021/0277193 | A1 | 9/2021 | Gomez et al. |
| 2021/0362098 | A1 | 11/2021 | Li et al. |
| 2022/0024771 | A1 | 1/2022 | Mahajan et al. |
| 2022/0212934 | A1 | 7/2022 | Vu et al. |
| 2022/0234898 | A1 | 7/2022 | Vu et al. |
| 2022/0243365 | A1 | 8/2022 | Han et al. |

FOREIGN PATENT DOCUMENTS

| | | |
|---|---|---|
| CN | 107556035 B | 1/2018 |
| CN | 108358541 A | 8/2018 |
| EP | 3070053 A1 | 9/2016 |
| JP | 2000072510 A | 3/2000 |
| JP | 2013056818 A | 3/2013 |
| JP | 2014514231 A | 6/2014 |
| JP | 2014205619 A | 10/2014 |
| JP | 2016536258 A | 11/2016 |
| JP | 2017529300 A | 10/2017 |
| JP | 2018517066 A | 6/2018 |
| JP | 2019502619 A | 1/2019 |
| JP | 2019513682 A | 5/2019 |
| KR | 20170125615 A | 11/2017 |
| WO | 2012125854 A1 | 9/2012 |
| WO | 2017025926 A1 | 2/2017 |
| WO | 2017092778 A1 | 6/2017 |
| WO | 2018005002 A1 | 1/2018 |
| WO | 2019012474 A1 | 1/2019 |
| WO | 2019095012 A1 | 5/2019 |

OTHER PUBLICATIONS

Hernandez, Yenny, "High-Yield Production of Graphene by Liquid-Phase Exfoliation of Graphite," Nature Nanotechnology, vol. 3, Sep. 2008, 7 pages.

Lotya, Mustafa, "Liquid Phase Production of Graphene by Exfoliation of Graphite in Surfactant/Water Solutions," J. Am. Chem. Soc., Feb. 19, 2009, 10 pages.

Narayan, Rekha, "Surfactant Mediated Liquid Phase Exfoliation of Graphene," Nano Convergence, 2015, 19 pages.

Yi, Min, "A Review on Mechanical Exfoliation for Scalable Production of Graphene," Journal of Materials Chemistry A, Jan. 2012, 17 pages.

Zhao, Weifeng, "Preparation of Graphene by Exfoliation of Graphite Using Wet Ball Milling," Journal of Materials Chemistry, Jun. 17, 2010, 3 pages.

D. Dimov, I. Amit, O. Gorrie, M. D. Barnes, N. J. Townsend, A. I. S. Neves, F. Withers, S. Russo, M. F. Craciun, Adv. Funct. Mater. 2018, 28, 1705183. https://doi.org/10.1002/adfm.201705183.

Liu, Wanshuang, et al. "Lignin-Assisted Direct Exfoliation of Graphite to Graphene in Aqueous Media and ItsApplication in Polymer Composites." Carbon, vol. 83, Mar. 2015, pp. 188-197. DOI.org (Crossref), https://doi.org/10.1016/j.carbon.2014.11.036.

Paton, Keith R., et al. "Scalable Production of Large Quantities of Defect-Free Few-Layer Graphene by ShearExfoliation in Liquids." Nature Materials, vol. 13, No. 6, Jun. 2014, pp. 624-630. DOI.org (Crossref), https://doi.org/10.1038/nmat3944.

Purkait, Taniya, et al. "Large Area Few-Layer Graphene with Scalable Preparation from Waste Biomass forHigh-Performance Supercapacitor." Scientific Reports, vol. 7, No. 1, Dec. 2017, p. 15239. DOI.org(Crossref), https://doi.org/10.1038/s41598-017-15463-w.

International Search Report for PCT/CA2020/050939 (3 pages).

Written Opinion of the International Searching Authority in PCT/CA2020/050939 mailed Oct. 20, 2020 (5 pages).

Notification of Reasons for Refusal, corresponding JP2021-571557 application, mailing date Aug. 28, 2024 (4 pages).

Examination Report, Australia App. No. 2020310951, dated Jul. 31, 2025 (5 pages).

* cited by examiner

PREPARATION OF HYDROUS GRAPHENE OXIDE FOR USE AS A CONCRETE ADMIXTURE

CROSS REFERENCE TO RELATED APPLICATIONS

This application is a National Stage of International Application No. PCT/CA2020/050939 filed on Jul. 6, 2020, which claims priority to earlier U.S. Provisional Application No. 62/871,355 filed on Jul. 8, 2019. The content of the above documents is incorporated herein by reference in its entirety.

TECHNICAL FIELD

The present disclosure relates to supplementary materials for strengthening concrete, and in particular the production of graphene oxide-based admixture concrete mixtures.

TECHNICAL BACKGROUND

Modern high strength concrete is expensive to produce and often suffers from cracking and spalling due in large part to its porosity. Supplementary cementitious materials (SCMs), such as fly ash, slag or silica fume, have helped mitigate this to some degree as have advanced water reducing admixtures such as polycarboxylate ether (PCE), but these materials are expensive and possibly face supply uncertainties (e.g., fly ash, as coal fired power plants are in decline).

Nanocarbon and micronized biochar additives have been proposed for use in high strength concrete mixture design; however, there are challenges faced with commercialization of nanocarbon concrete additives: the cost is potentially prohibitive, even when used in small mix ratios; strong van der Waals forces between nanocarbon particles create a tendency for nanocarbon additives to agglomerate, inhibiting effective dispersion in the concrete matrix; and while smaller biochar particle sizes have been shown to produce better results, particle size reduction with typical comminution devices (e.g., ball mills, attritors, sonicators) has limitations and can be prohibitively costly as well.

DETAILED DESCRIPTION

The embodiments and examples set out below provide a process for the production of a graphene oxide-based additive using a low-cost, highly scalable high-shear liquid phase exfoliation techniques with a dispersant. This additive, hydrous bio-graphene oxide (hBGO), when added to concrete, provides enhanced hydration and micro-reinforcement that may meet or exceed the performance of commonly used SCMs and superplasticizers in the production of high-strength concrete, at a lower cost and from renewable biomass feedstock.

Figure 1:
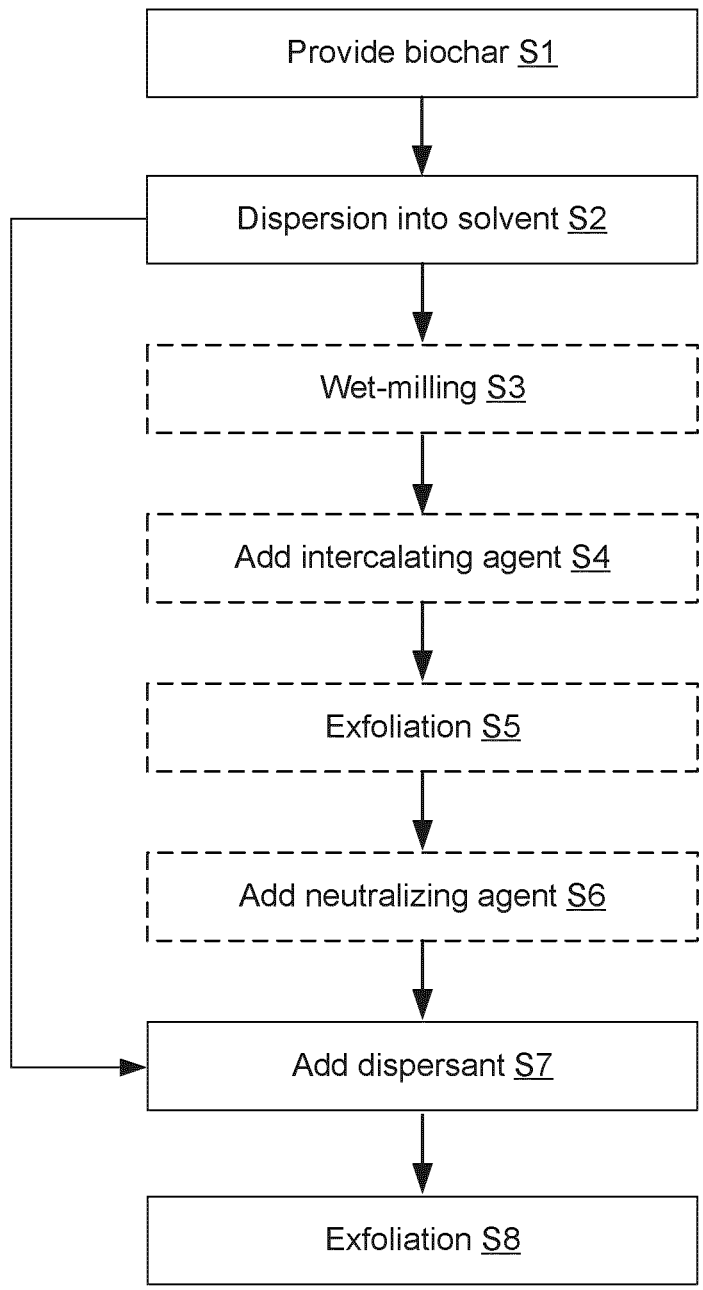
FIG. 1 is a flowchart illustrating a high-level process for production of hydrous bio-graphene oxide.

Briefly, as shown in FIG. 1, a graphitic carbon source is provided in solvent and is subject to liquid phase exfoliation in a high-shear environment with a dispersant, preferably an aqueous surfactant or a water miscible solvent, to produce a stable aqueous graphene dispersion (graphene oxide, or GO) that can be more easily dispersed in a concrete matrix. Preferably, biochar provides (three-dimensional) graphitic carbon to produce sustainable (two-dimensional) graphene carbon (bio-graphene oxide, or BGO). Biochar is a pyrogenic carbonaceous material produced by thermochemical conversion of renewable carbonaceous biomass feedstock (e.g., by pyrolysis, carbonization, and/or activation). By contrast, activated carbon is produced from any carbon source including fossil sources, waste, or renewable resources. Processes for carbonization of feedstock will be known to those skilled in the art.

The process can include one or more preparatory or intermediate steps such as wet-milling and the use of an intercalating agent (which may be subsequently completely or partially neutralized) and at least partial exfoliation. These additional steps may facilitate the exfoliation and dispersion of the bio-graphene oxide when subjected to high-shear liquid phase mixing.

Graphene oxide generally has an affinity to both polar and non-polar solvents, so either type of solvent may be used; however, in the case of a concrete admixture it may be desirable to use water or another polar, water-soluble solvent for the dispersion in order to be compatible with the concrete mixture.

A surfactant in the dispersion lowers the surface tension of water, and adsorbs to the two-dimensional graphene. This helps to induce dispersion of and reduce the agglomeration of exfoliated BGO crystals and few layer bio-graphene oxide (FLBGO) particles, which have strong van der Waals attractive forces. This provides a more stable colloidal dispersion of BGO that does not need to be re-dispersed (or can be easily re-dispersed) prior to utilization at a ready-mix plant or jobsite. Furthermore, the better the colloidal stability of the BGO, the higher the probability that it will be dispersed evenly in the alkaline mortar or concrete matrix leading to optimal performance by BGO and/or FLBGO.

Possible surfactants and solvents for use in the process include lignosulfonate, polycarboxylate ether (PCE), dihydrolevoglucosenone (DLGO, e.g., Cyrene®), sodium dodecyl sulfate (SDS), sodium cholate, supercritical carbon dioxide ($scCO_2$), poloxamers (Pluronics®), saponin, and combinations thereof. Appropriate selection of a surfactant and/or solvent may be made by those skilled in the art based on desired effect on concrete. For example, lignosulfonate is recognized as an important admixture for concrete as a plasticizer and set retarder, and has been shown to be effective as a dispersant for graphene. PCE is similarly recognized as an important admixture for concrete as a superplasticizer, and an effective dispersant for graphene in cement pastes. DLGO has solubility characteristics similar to graphene, and is a good solvent for rapid exfoliation and stable dispersions. While aqueous phase anionic and non-ionic surfactants in low concentrations are known to provide good results for the dispersion of graphene oxide via liquid phase exfoliation, anionic polymeric surfactants, such as lignosulfonate and PCE, may be selected when a polydisperse, water reducing polymer is desirable in the preparation of the composite matrix. The inclusion of lignosulfonate or PCE in the dispersant may indeed provide a double benefit to the concrete mix as they are both useful water-reducing admixtures and plasticizers for concrete.

An intercalation chemical may be used to facilitate the process of high-shear liquid phase exfoliation. Intercalation reversibly inserts a molecule or ion into materials with layered structures, such as graphitic carbon, to increase interplanar spacing and subsequently reduce interlayer van der Waals forces to aid in the mechanical exfoliation of graphitic carbon. Appropriate intercalating agents may be selected by those skilled in the art to provide a source for sufficiently small ions to enter the interplanar spaces in graphitic carbon. Examples of suitable agents for use in a concrete admixture may include potassium hydroxide (KOH), sodium hydroxide (NaOH), and lithium hydroxide (LiOH). A strongly caustic intercalating agent may induce functionalization and etching (the formation of oxygen functional groups and defects on the planar surface and edges of carbon sheets), which are both potentially beneficial when hBGO is used as a concrete additive as they may provide nucleation sites that promote hydration of cement particles.

A strongly caustic intercalant may significantly raise the pH of hBGO (up to 14) which could cause challenges with handling and use as an admixture and could also lead to aggregation or agglomeration of aqueous BGO particles (small particles tend to agglomerate under high pH conditions). To mitigate the challenges of a high pH admixture and aggregation or agglomeration, the pH of hBGO may be lowered to a more neutral range (e.g., 7 or 8). Selection of a suitable neutralizing agent will be known to those skilled in the art. For example, an acid such as acetic acid may be added directly or in solution to the dispersion. As another example, the hBGO dispersion may be sparged with carbon dioxide ($CO_2$), optionally collected as waste $CO_2$. When combined with water, the $CO_2$ will produce carbonic acid available for reaction. In the case of KOH, NaOH or LiH used as the intercalant they will react with carbonic acid forming potassium carbonate ($K_2CO_3$), sodium carbonate ($Na_2CO_3$) or lithium carbonate ($Li_2CO_3$) which are water soluble salts and are compatible, if not beneficial, to concrete when included as an admixture. Furthermore, such neutralization with $CO_2$ would act as a method of carbon sequestration into concrete without negative impact on mechanical performance.

Including hBGO in concrete at around 0.1% by weight of cement may yield increases in compressive strength, flexural strength/ductility and a decrease in permeability, while achieving early strength development and without negatively impacting workability. Without wishing to be bound by theory, it is believed that these performance improvements may be due to enhanced hydration, namely an increase in the formation of calcium silicate hydrate (C—S—H) crystals. This is due to the manifold oxygen functional groups of BGO that provide strong hydration crystal nucleation sites. This increased hydration may result in increased consumption of mix water in the formation of C—S—H crystals, meaning that higher water to concrete ratios may be possible, improving workability of the concrete without compromising strength or leading to increased porosity. Furthermore, because BGO particles are hygroscopic, they may help retain moisture within the concrete matrix and provide nano-curing for enhanced hydration at the capillary and gel pore level (<10 nm). In addition, graphene oxide is known to provide nano-reinforcement in the concrete matrix and to contribute to tortuous fractal planes upon fracture. Finally, graphene oxide particles have been shown to restrict ice crystal growth functioning as a sort of anti-freeze which may impart added resistance to the deleterious effects of freeze-thaw on concrete.

It may be noted that the quantity of hBGO required in a concrete mix to produce beneficial effects is relatively low compared to the quantities of other commonly used constituents such as SCMs. This means that the inclusion of hBGO is unlikely to affect the proportions of other components of the mix (water, cement, admixtures), permitting the continued use of previously-developed concrete formulations. Furthermore, when hBGO is produced using lignosulfonate or PCE which are already commonly used admixtures, the hBGO may provide a source of admixtures in the concrete mix, reducing the amount of additional lignosulfonate or PCE that needs to be added.

FIG. 1 is a flowchart depicting a process for producing a hBGO dispersion for use in a concrete mix. In a first example implementation, a graphitic carbon source, such as biochar, is provided at S1 and dispersed (added) into a solvent (e.g., water) at S2. A dispersing agent is added at S7 and the mixture is exfoliated in a high-shear environment at S8. In a further example embodiment, one or more additional steps are optionally carried out prior to addition of the dispersing agent. The initial dispersion into solvent at S2 may result in an initial reduction in graphitic carbon particle size (for example, <300 microns). Optionally the carbon is then wet milled at S3 to further reduce particle size. As a further optional step, an intercalating agent may be added at step S4 to facilitate an exfoliation step S5. After this exfoliation step, a neutralizing agent is optionally introduced at S6, and a dispersing agent (such as lignosulfonate, PCE, or other suitable agent) added at S7 to improve stability and reduce agglomeration in the hBGO dispersion. The mixture is then subject to a high-shear mixing environment in an exfoliation step at S8. This exfoliation step may be continued until the concentration of BGO and particle size distribution in the dispersion reach a desired target range.

Those skilled in the art will appreciate that these steps may be varied, reordered or combined. For instance, in the first implementation, the initial step of the dispersion in solvent S2 and the addition of a dispersing agent S7 may be effectively combined by providing an aqueous solution of the dispersing agent, and then combining the aqueous solution of the dispersing agent and the graphitic carbon for exfoliation at step S8. The wet-milling step, if carried out, may also be combined with the introduction of the intercalating agent (it may be added to the solvent used during wet-milling), or alternatively the addition of the intercalating agent may be carried out at the exfoliation step S5. The order of addition of the dispersing agent and neutralizing agent may be reversed, or the two components may be added together to the hBGO; or, the dispersing agent may be added prior to or during exfoliation. The final concentration and particle size distribution of BGO in the aqueous dispersion may be adjusted by addition of one or more constituents during the final exfoliation at S8, although such adjustments may also be carried out earlier in the process if desired.

Figure 2:
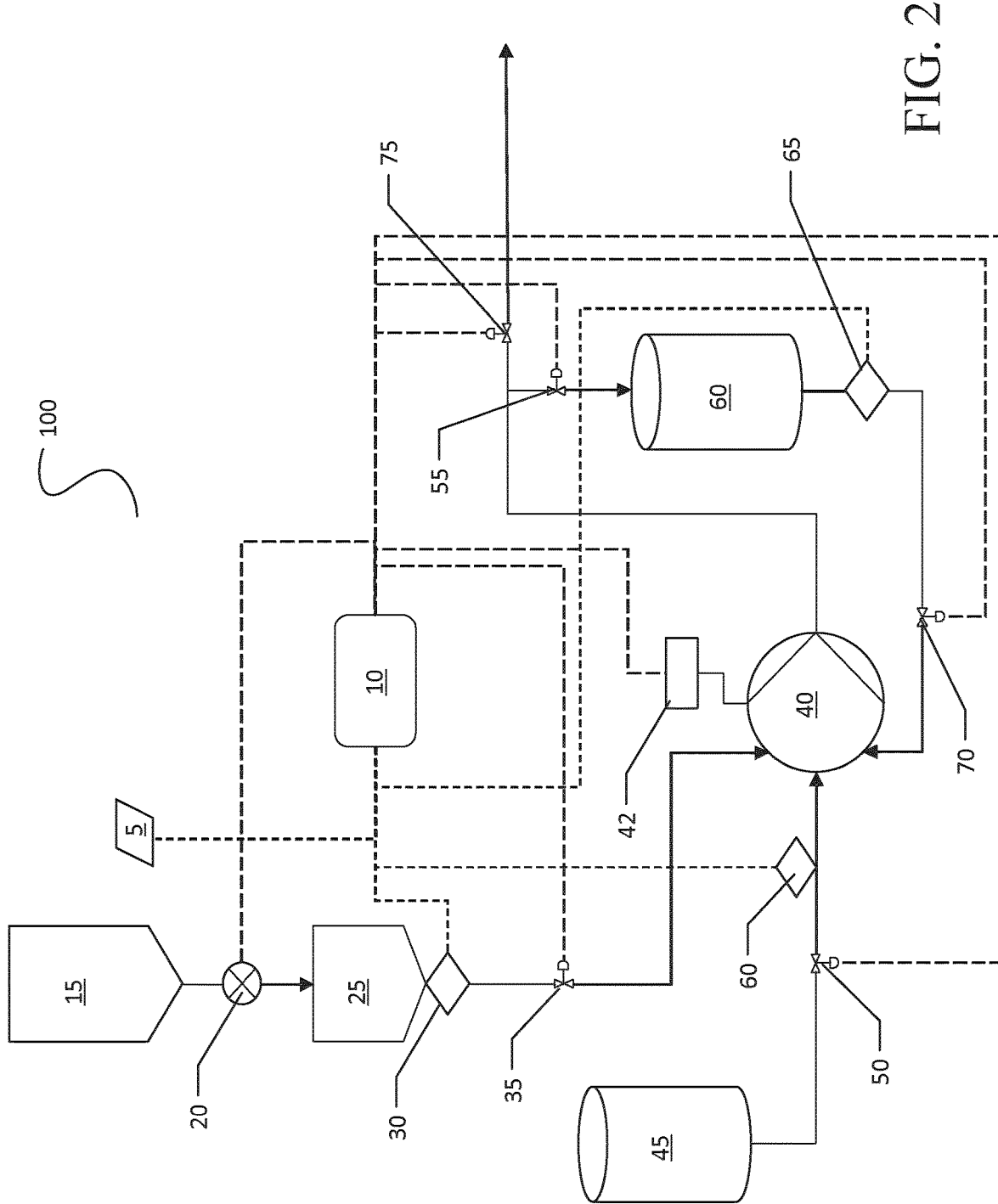
FIG. 2 is a schematic diagram of a first example system for production of hydrous bio-graphene oxide.

FIG. 2 is a schematic drawing of an example system 100 for the production of hBGO. Briefly, biochar and an aqueous dispersant (in this example, aqueous lignosulfonate) is fed by a dosing system under operator control to a high-shear mixer to produce hBGO in dispersion at a specified concentration according to the desired application. The resultant hBGO can be fed to a concrete batch mixer.

In the example system 100, a biochar source 15, in this example a primary hopper, feeds biochar into a secondary hopper 25 via a rotary feeder 20. A load cell 30 measures the amount by weight of biochar fed into the secondary hopper until a specified amount is received in the secondary hopper. Load cell 30 output is directed to a digital controller 10 (e.g., a programmable logic controller, desktop computer, or any other appropriate microprocessor-based computing system) which monitors sensor outputs and controls the operation of various components of the system, such as valves and the high-shear pump, based on operator input 5. When the digital controller 10 determines that a target amount of biochar is obtained from the primary hopper 15, the biochar in the second hopper 25 is released to the high-shear pump 40 via slide gate valve 35.

Aqueous dispersant is stored in tank 45 and fed through a flow-control valve 50 to the high-shear pump 40. A flow meter 60 in communication with the digital controller 10 monitors the flow from the tank 45 to determine an (approximate) amount of dispersant entering the pump 40. The flow of dispersant into the pump 40 draws biochar into the inlet stream and into a volute of the high-shear pump 40. When a specified amount of dispersant has been detected flowing into the pump 40, the digital controller 10 closes the valve 50.

A variable frequency drive 42 of the high-shear pump 40 (e.g., a Silverson™ High Shear Inline Mixer, Silverson Machines, Inc., Massachusetts, USA which is capable of rotating a rotor or impeller to provide high-shear mixing) is controlled by the digital controller. As the pump 40 operates, its rotor creates mechanical and hydraulic forces that propel suspended biochar particles (typically greater than 50 microns) against a stator to comminute, exfoliate and disperse BGO into the aqueous dispersant to produce hBGO. The resultant hBGO is directed through an outlet and open valve 55 (valve 75 may be closed at this stage) to an hBGO holding vessel or tank 60, where the concentration of BGO in the dispersant is measured using an inline ultraviolet-visible (UV-vis) spectrophotometer 65, which can be used to estimate concentration from UV-vis light absorbance measurements. If the dispersion of hBGO is within a specified UV-vis absorbance range, valve 75 is opened and the hBGO can be dispensed into a concrete drum mixer. Otherwise, the hBGO can be repeatedly recycled through valve 70 into the high-shear pump 40, where either additional dispersant, biochar, or both, can be added to the pump for further shearing until the concentration of BGO meets a specified range.

The concentration and optionally the quality of hBGO may be determined by other means. As another example, the particle size distribution of BGO in the dispersant may be measured using an inline laser diffraction sensor (not shown in FIG. 1), based on an estimate of particle size derived from the diffraction of laser-emitted photons by the hBGO. If the determined particle size distribution is within a target range (e.g., a quality target may be set at 90% under 50 microns, consistent with typical particle size of Portland cement), then the valve 75 is opened and the hBGO can be dispensed into a concrete drum mixer. Otherwise, as described above, the hBGO can be repeatedly recycled through valve 70 into the high-shear pump 40, where optionally additional dispersant and/or biochar may be added to the pump for further shearing until the particle size of BGO meets a specified range. Those skilled in the art will appreciate that other known sensors and techniques may be used to determine the concentration of BGO or quality of hBGO.

Since the input biochar and dispersant are under computer control, the specific composition of the resultant hBGO may be specified by the operator to suit a particular application. For example, it may be desirable to have a specific target concentration of lignosulfonate or PCE (if these are used as dispersing agents) in the concrete mixture. Different compositions can be provided based on a target composition (e.g., by weight) of biochar and a target ratio of biochar to dispersing agent in the final concrete mixture. These inputs, together with any constraints (e.g., a maximum dose of dispersing agent in the concrete) can be used to determine the input ratios or amounts of dispersing agent and biochar for the high-shear pump 40, and to determine a target concentration or range of concentrations of BGO in the hBGO produced by the high-shear pump 40. Further, since the above system permits the customization of BGO concentration in hBGO for a desired concrete mix, the system can be provided on a skid that is transportable to a job site so that the hBGO dispersion can be produced on demand on-site, ready to be mixed with concrete. Alternatively, hBGO may be produced offsite and dispensed into a plastic or metal container for storage and shipping to a concrete production or mixing facility in either a colloid or dry form.

The above-described example process may be carried out on precalculated amounts of graphitic carbon source and aqueous dispersant to produce hBGO at a predetermined concentration for use as a concrete admixture. In another example process, the constituents of the final admixture may be computed and dosed during dispersion or exfoliation. FIG. 3 is a schematic drawing of a further example system 200 for the production of hBGO. A similar dosing system controlled by operator input 5 to a digital controller 110 as described above may be employed to receive sensor inputs from various points in the system 200 and to control valves, pumps, and mixers to the flow of constituents through the appropriate cycles as will be understood by those skilled in the art. Thus, in this example system, the graphitic carbon source (e.g., biochar) in a primary hopper 115 is fed into a secondary hopper 120 via rotary feeder 118 until the digital controller 110 determines from load cell 122 feedback that a target amount has been received in the secondary hopper. This biochar is then dispensed into a high shear dispersing unit 130 (e.g., by opening a slide valve) where it is initially dispersed in water. The volume of water may also be controlled by the digital controller 110 monitoring output from a flow meter 132. The water and graphitic carbon are subject to a high-shear environment such as a high shear dispersing unit 130, such as the high-shear pump described above. Another example of a suitable unit is a Quadro® Ytron ZC™ Disperser, Quadro Engineering Corp., Waterloo, Ontario, Canada. If additional wet-milling and/or intercalating steps are to be carried out, the initial dispersion is then pumped using pump 140 to another high-shear environment such as high-shear wet-milling unit 150, where the particle size of the biochar can be further reduced and where exfoliation may occur. A suitable unit 150 includes a Quadro® HV™ Emulsifier & Wet Mill, also available from Quadro Engineering Corp.

The dispersion is cycled through the unit 150 and a tank reactor 160 using the pump 140. The dispersion, while in the tank reactor 160, may be subject to continuous mixing by mixer 170 to create a substantially uniform dispersion. One or more sensors (e.g., pH meter 162, temperature sensor 164, spectrophotometer 166, and/or laser diffraction sensor 168) are also provided for detecting the concentration and/or particle size distribution and/or quality of the hBGO, and to implement dosing of the intercalating agent, neutralizing agent, and dispersing agent, as the case may be. An intercalating agent is dispensed into the tank reactor 160, for example using a dosing pump, where it is mixed by the mixer 170. The dispersion is cycled by the pump 140 through the high shear wet-milling unit 150 where the BGO is exfoliated (or further exfoliated), then cycled back to the tank reactor 160 where one or more sensors measure characteristics of the dispersion until target values or ranges are achieved (e.g., concentration of BGO, and/or particle size distribution). When the target is achieved, optionally the intercalating agent is neutralized with the addition of a neutralizing agent. For example, the dispersion may be sparged with $CO_2$ from a local flue gas source until the pH sensor 162 indicates that a target pH range has been reached, or alternatively a suitable dose of a neutralizing agent based on the amount of intercalant is computed and introduced into the tank reactor 160. A dispersing agent, such as an aqueous surfactant, may then be added and mixed into the hBGO dispersion in the tank reactor 160. The dispersion can then be cycled through the unit 150 for exfoliation until a final BGO concentration and target particle size distribution is achieved. The final dispersion may then be dispensed.

As will be appreciated by those skilled in the art, the above-described example processes and variations provide a "one-pot" synthesis of a stable hBGO dispersion ready for use as a concrete admixture, in that the processes may produce substantially no waste, since there is no need for any further separation or purification steps to remove intermediate chemicals or by-products. The chemicals selected for use in the example processes serve dual purposes by both facilitating the production of graphene oxide from graphitic carbon, and enhancing the effect of graphene oxide as a concrete additive. Due to the high atom economy of the process, cost and productivity rate can be kept low and waste minimized.

Thus, there is provided a concrete additive comprising an aqueous dispersion of hydrous graphene oxide, where the graphene oxide may be a bio-graphene oxide.

There is further provided a process for manufacturing an aqueous dispersion of graphene oxide, the process comprising: subjecting graphitic carbon in water or an aqueous solution to a high-shear environment in the presence of a dispersing agent to exfoliate graphene oxide.

In one aspect, the process further comprises the step of adding the dispersing agent to the graphitic carbon in the water or aqueous solution prior to subjecting the graphitic carbon in the water or aqueous solution to the high-shear environment.

In another aspect, the process further comprises, prior to the step of adding the dispersing agent, the step of wet-milling the graphitic carbon in the water or aqueous solution.

In a further aspect, the process further comprises adding an intercalating agent to the graphitic carbon in the water or aqueous solution prior to or concurrently with subjecting the graphitic carbon in the water or aqueous solution to the high-shear environment.

In another aspect, the intercalating agent comprises a caustic intercalating agent. The intercalating agent comprises at least one of potassium hydroxide, sodium hydroxide, and lithium hydroxide. In some embodiments, the intercalating agent comprises potassium hydroxide.

In still another aspect, the process further comprises neutralizing the exfoliated graphene oxide in the water or aqueous solution prior to adding the dispersing agent. The neutralizing may comprise adding an acid, or sparging the exfoliated graphene oxide in the water or aqueous solution with carbon dioxide.

In a further aspect, the step of subjecting the graphitic carbon in the water or aqueous solution to the high-shear environment comprises cycling the graphitic carbon in the water or aqueous solution in a high-shear wet mill.

In some embodiments, the graphitic carbon is provided in aqueous solvent solution is water.

In one aspect, the dispersing agent comprises at least lignosulfonate and/or polycarboxylate ether.

In yet another aspect, the process further comprises determining an amount of graphitic carbon and an amount of the dispersing agent required for a concrete composition, by: receiving the graphitic carbon and the dispersing agent in the aqueous solution in predetermined proportions; measuring a concentration or particle size distribution of graphene oxide in the aqueous dispersion after exfoliation; and recycling the graphene oxide in the aqueous dispersion into the high-shear environment in dependence on the measured concentration or particle size distribution.

In a further aspect, the graphitic carbon is biochar and the exfoliated graphene oxide is exfoliated bio-graphene oxide.

There is also provided a concrete admixture comprising an aqueous dispersion of graphene oxide.

In one aspect, the graphene oxide is a biochar-derived graphene oxide.

In another aspect, the aqueous dispersion comprises a dispersing agent. The dispersing agent comprises at least lignosulfonate and/or polycarboxylate ether.

In a further aspect, the concrete admixture comprises potassium carbonate and/or sodium carbonate.

In another aspect, the concrete admixture comprises at least one of potassium hydroxide, sodium hydroxide, and lithium hydroxide. In one embodiment, the admixture comprises potassium hydroxide.

In still a further aspect, the concrete admixture further comprises a water-reducing admixture or a plasticizer.

The concrete admixture may be comprised in a concrete composition.

There is also provided an apparatus, comprising: a graphitic carbon source; a dispersant source; a high-shear device comprising an inlet in fluid communication with the graphitic carbon source and the dispersant source, the high-shear device for producing hydrous graphene oxide; a vessel in fluid communication with an outlet of the high-shear device to receive the hydrous graphene oxide; and at least one measurement means for determining at least one characteristic of graphene oxide in the received hydrous graphene oxide. In one aspect, the high-shear device comprises a wet-milling unit.

In one aspect, the apparatus further comprises an intercalating agent source having an outlet in fluid communication with the vessel.

In another aspect, the apparatus further comprises a neutralizing agent source having an outlet in fluid communication with the vessel.

In a further aspect, the at least one characteristic comprises pH, concentration of graphene oxide, and/or particle size distribution.

In still a further aspect, the at least one measurement means comprises a pH meter, a spectrophotometer, and/or a laser diffraction sensor.

Figure 3:
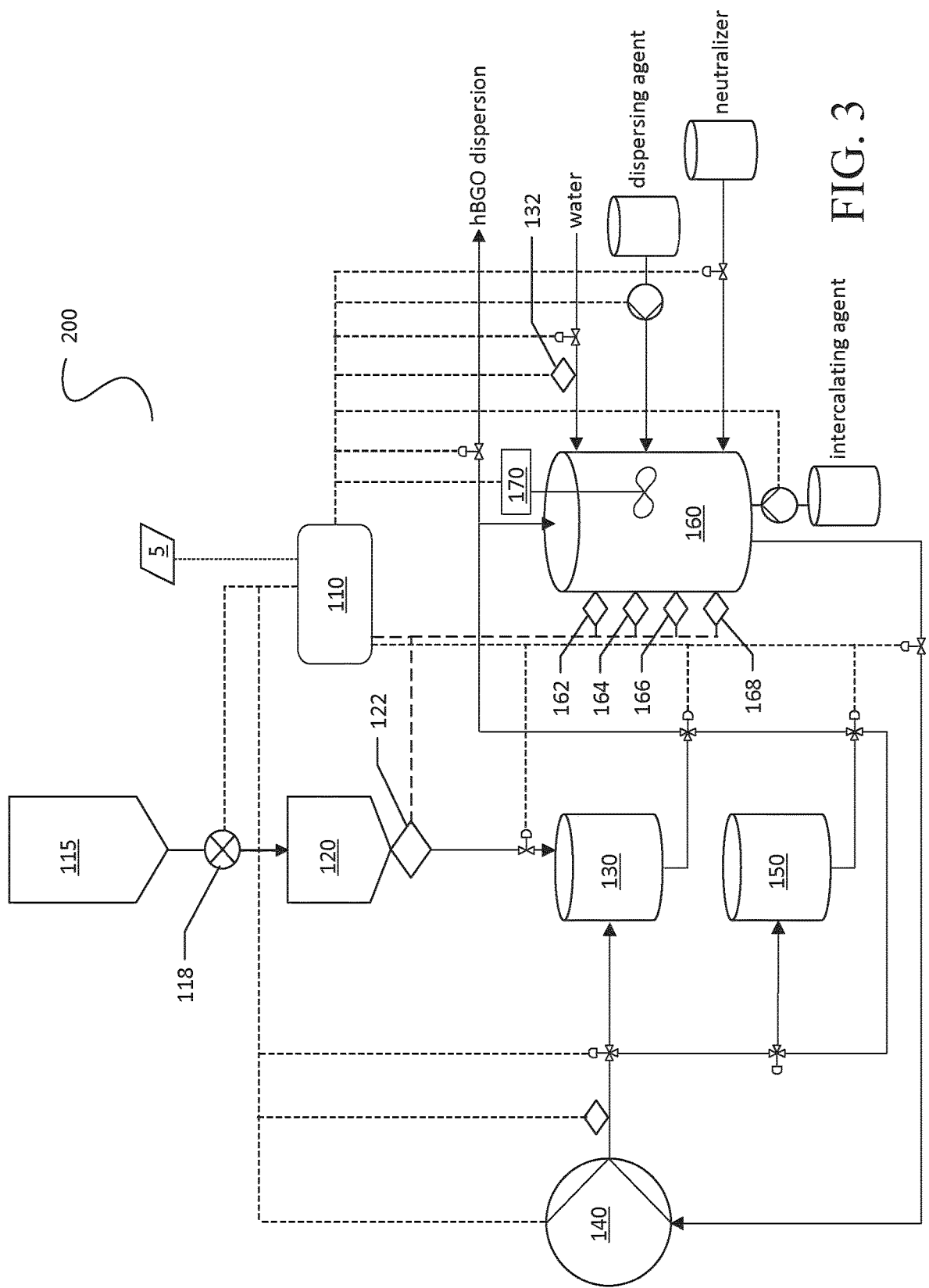
FIG. 3 is a schematic diagram of a second example system for production of hydrous bio-graphene oxide.

Those skilled in the art will appreciate that the systems depicted in FIGS. 2 and 3 may be varied while still achieving the production of hBGO dispersions. Various elements may be omitted or combined. For instance, the preparatory steps of wet-milling at unit 150 in the system 200 of FIG. 3 to prior to exfoliating into aqueous dispersant may be omitted, or combined with the addition of the intercalating agent. In some implementations, wet-milling may be carried out without the addition of an intercalating agent and/or neutralizing agent. The dispersing agent may be added to the dispersion prior to cycling through the high shear wet-milling unit. Different types of sensors may be employed to measure the characteristics or quality of the produced hBGO. Such variations are well within the capabilities of those of ordinary skill in the art.

I claim:

1. A process for manufacturing an aqueous dispersion of graphene oxide, the process comprising:
   subjecting biochar in a solvent, the solvent comprising water, to a high-shear rotor-stator mixing environment in the presence of a dispersing agent to exfoliate graphene oxide.

2. The process of claim 1, wherein the solvent is water, the process further comprising the step of adding the dispersing agent to the biochar in the solvent prior to subjecting the biochar to exfoliation in the high-shear rotor-stator mixing environment.

3. The process of claim 2, further comprising, prior to the step of adding the dispersing agent, the step of wet-milling the biochar.

4. The process of claim 1, further comprising the step of adding an intercalating agent to the biochar in the solvent prior to or concurrently with subjecting the biochar in the solvent to the high-shear rotor-stator mixing environment.

5. The process of claim 4, wherein the intercalating agent comprises a basic intercalating agent, and the intercalating agent is added prior to subjecting the biochar in the solvent to exfoliation in the high-shear rotor-stator mixing environment, the process further comprising the steps of performing a first exfoliation of the biochar in the solvent in the presence of the intercalating agent to provide exfoliated graphene oxide in the solvent and adding a neutralizing agent, prior to subjecting the exfoliated graphene oxide to the high-shear rotor-stator mixing environment in a further exfoliation step.

6. The process of claim 5, wherein the intercalating agent comprises at least one of potassium hydroxide, sodium hydroxide, and lithium hydroxide.

7. The process of claim 6, wherein the intercalating agent comprises potassium hydroxide.

8. The process of claim 5, wherein the neutralizing agent comprises an acid.

9. The process of claim 8, wherein adding the neutralizing agent comprises sparging the exfoliated graphene oxide in the solvent with carbon dioxide.

10. The process of claim 1, wherein the step of subjecting the biochar in the solvent to the high-shear rotor-stator mixing environment comprises circulating the biochar in the solvent through the high-shear rotor-stator mixing environment and a tank reactor using a pump, wherein the high-shear rotor-stator mixing environment comprises a high-shear wet mill.

11. The process of claim 1, wherein the solvent is water.

12. The process of claim 1, wherein the dispersing agent comprises lignosulfonate.

13. The process of claim 1, wherein the dispersing agent comprises polycarboxylate ether.

14. The process of claim 1, wherein the dispersing agent comprises a composition of at least polycarboxylate ether and lignosulfonate.

15. The process of claim 10, further comprising, after circulating the biochar in the solvent:
   measuring a concentration or particle size distribution of graphene oxide in the aqueous dispersion; and
   further circulating the graphene oxide in the aqueous dispersion into the high-shear rotor-stator mixing environment with additional biochar, additional dispersing agent, an intercalating agent, and/or a neutralizing agent in dependence on the measured concentration or particle size distribution.

16. The process of claim 1, further comprising:
   prior to subjecting the biochar in the solvent to the high-shear rotor-stator mixing environment, receiving the biochar and the dispersing agent in predetermined proportions;
   after subjecting the biochar in the solvent to the high-shear rotor-stator mixing environment to exfoliate graphene oxide:
      measuring a concentration or particle size distribution of the graphene oxide in the solvent using at least one inline sensor of the high-shear rotor-stator mixing environment;
      adding to the biochar in the solvent one or more of biochar, dispersing agent, an intercalating agent, or a neutralizing agent in dependence on the measured concentration or particle size distribution, and
      further subjecting the biochar in the solvent to the high-shear rotor-stator mixing environment to further exfoliate graphene oxide and further measuring the concentration or the particle size distribution until the measured concentration or particle size distribution meets a target range.

* * * * *